(12) United States Patent
Dempsey

(10) Patent No.: US 6,638,137 B1
(45) Date of Patent: Oct. 28, 2003

(54) REMOVING INVESTMENT CASTING GATES

(75) Inventor: Robert J. Dempsey, Rocky River, OH (US)

(73) Assignee: Precision Metalsmiths, Inc., Cleveland, OH (US)

( * ) Notice: Subject to any disclaimer, the term of this patent is extended or adjusted under 35 U.S.C. 154(b) by 126 days.

(21) Appl. No.: 09/680,013

(22) Filed: Oct. 5, 2000

(51) Int. Cl.[7] .......................... B24B 19/00; B26D 7/00; B26D 31/00
(52) U.S. Cl. ..................... 451/5; 451/381; 83/411.7; 164/70.1; 164/135; 164/262
(58) Field of Search ............................. 451/5, 15, 129, 451/381; 83/411.7, 488; 164/34, 35, 36, 244, 45, 70.1, 135, 262

(56) References Cited

U.S. PATENT DOCUMENTS 4,123,876 A * 11/1978 Simmons et al. ........... 451/151

\* cited by examiner

Primary Examiner—Joseph J. Hail, III
Assistant Examiner—Hadi Shakeri
(74) Attorney, Agent, or Firm—Pearne & Gordon LLP

(57) ABSTRACT

An improvement in the after-cast operation of removing the casting gate from an investment casting comprising a formed locator on the gate, the formed locator being capable of locating the casting in a desired position and of being gripped to hold the casting in place while the gate is severed near the casting. An investment casting pattern and gate attached thereto, the pattern gate being distinguished by a locator formation on the gate at a location spaced from the casting pattern.

4 Claims, 1 Drawing Sheet

US 6,638,137 B1

REMOVING INVESTMENT CASTING GATES

BACKGROUND OF THE INVENTION

The present invention relates generally to the investment casting art, and more specifically to the after-cast operation of removing the gates from investment castings.

As will be understood by those familiar with the investment casting art, and as explained, for example, in U.S. Pat. No. 4,109,699, the disclosure of which is hereby incorporated by reference, a pattern assembly is prepared by attaching a plurality of casting patterns around a cylindrical sprue or center tree to form a branched "set-up". The patterns are connected to the center tree by gates. The patterns, which are replicas of the parts to be cast in metal, are made of wax, synthetic resin or a wax and synthetic resin composition, as are the gates. The pattern set-up is coated or invested with a suitable slurry which is allowed to harden to form a refractory mold. Thereafter, the patterns, gates and center tree are removed to form the mold cavities which can be filled with molten metal that is allowed to solidify.

U.S. Pat. No. 4,123,876 shows a typical investment cast set-up that comprises a tubular center tree and rows of castings attached to the outside of the center tree by gates. The tubular center tree, castings and gates duplicate the pattern set-up which was used to make the mold and then subsequently removed to form the mold cavities. U.S. Pat. No. 4,123,876 also shows a cut-off machine for cutting through the metal gates in order to separate the castings from the center tree.

When the castings have been removed from the center tree, it is necessary to cut off the metal stub ends of the gates that extend from the castings. A conventional practice is for an operator to grasp each individual casting and press the stub end of the gate against an abrasive wheel or belt until the stub end is flush with the casting or is within a specified tolerance band. This is a labor intensive and time consuming operation. The operation is particularly difficult when the casting has a curved outer surface which requires the casting to be manipulated by the operator in order to conform the stub end of the gate to the curvature of the casting.

An alternative, mechanized operation involves the use of an automatic machine capable of grinding a plurality of parts at one time. These machines usually require a separate fixture for holding each casting during the cut-off operation. Where a number of castings are to be ground simultaneously, a separate holding means on each fixture may be required for each different casting size and shape. The very large number of fixtures that are necessary results in high tooling costs.

It is often cost effective to make parts close to near net shape by investment casting, and then to machine selected dimensions that require closer tolerances than obtainable by casting, as well as occasional features which can be produced by machining at a lower cost than by casting. The practice of casting to near net shape requires even more tooling for after cast operations, which increases the cost even further.

SUMMARY OF THE INVENTION

An object of the present invention is to improve after cast operations generally, and to eliminate the need for excessive fixturing costs in particular.

One aspect of the invention is an improvement in the manufacture of an investment casting having a gate that is removed in an after-cast operation, the improvement comprising the steps of making the casting gate with a locator capable of locating the casting in a desired position and of being gripped to hold the casting in place, gripping the locator, and cutting through the gate near the casting while gripping the locator.

Another aspect of the invention is an improved investment casting pattern including a pattern gate attached thereto, the improvement comprising a grippable locator formed on the pattern gate at a location spaced from the casting pattern.

The locator feature comprising the invention is a generic locating formation which is made integrally with the casting gate. It is not specific to any particular casting shape or gate configuration. A small number of clamps which coact with the locator on the stub end of the casting gate can be used with a large number of different casting shapes and sizes. This is especially economical when castings are ordered intermittently, since the custom fixtures used in the past can be employed only for specific casting orders and are then stored for periods of non-use.

While the locator feature has been described as an integral part of the casting gate, it will be understood that it also is an integral part of the pattern gate, since the casting and casting gate replicate the pattern and pattern gate. An added benefit of the locator feature on the pattern gate is that it can be grasped by a robot to remove the pattern with its gate from the injection mold. The robot, while clamping onto the locator of the pattern gate, can either place the pattern on a tray or in a container or, if desired, the robot can place the end of the pattern gate into a hot melt of wax, resin, etc. and then stick the end of the pattern gate on a center tree, such as shown in the above referenced U.S. Pat. No. 4,109,699. While robots have been used in the past, they are not always cost effective, especially for small orders, because of the great of variety of end-of-arm tooling needed for the large number of different pattern shapes and sizes that the robot is required to handle. The invention makes it possible to employ a robot with a generic clamp that can process large numbers of small volume casting orders.

Other features, advantages and a fuller understanding of the invention will be had from the following detailed description and the accompanying drawing.

DESCRIPTION OF THE PREFERRED EMBODIMENT

Figure 1:
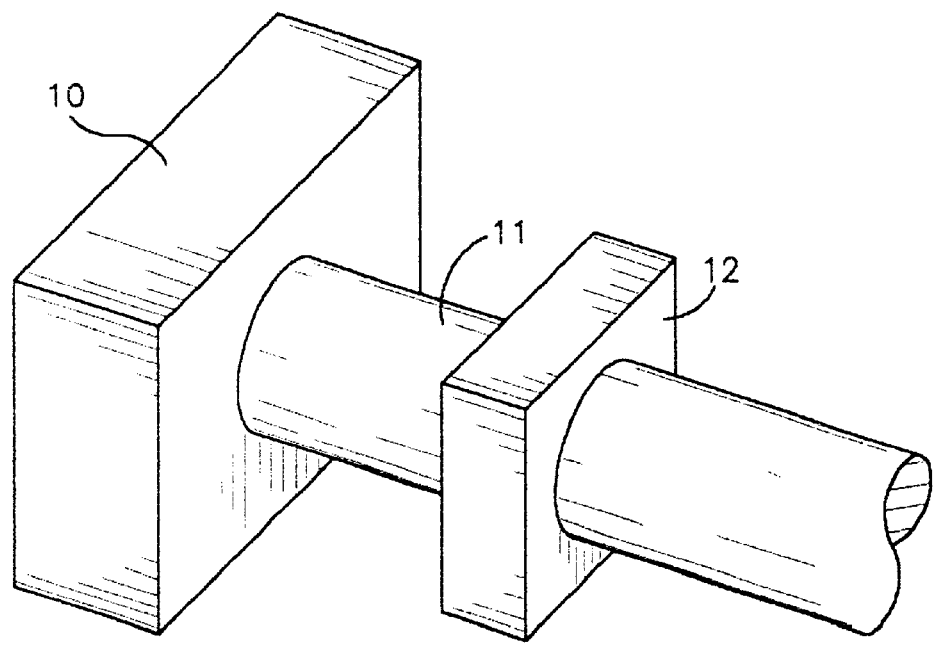
FIG. 1 is a perspective view showing a casting pattern and gate formed with an illustrative locator.

Referring first to FIG. 1, reference numeral 10 designates an investment casting pattern which is to be reproduced in metal. A pattern gate 11 is attached to the casting pattern 10 and a locator pattern 12 is formed integrally with the gate at a location spaced from the casting pattern 10.

As shown, the pattern gate 11 is cylindrical and the locator 12 is an enlarged rectangular section. In practice, the pattern gate and locator section can vary widely in shape and size. More particularly, the gate can have any desired cross-sectional shape and the locator pattern 12 can be of any desired shape that can be conveniently clamped. For example, it can be circular, a groove in the outer surface of the pattern gate, a ridge in the outer surface of the pattern gate, one or more ears which extend from the pattern gate, etc.

Figure 2:
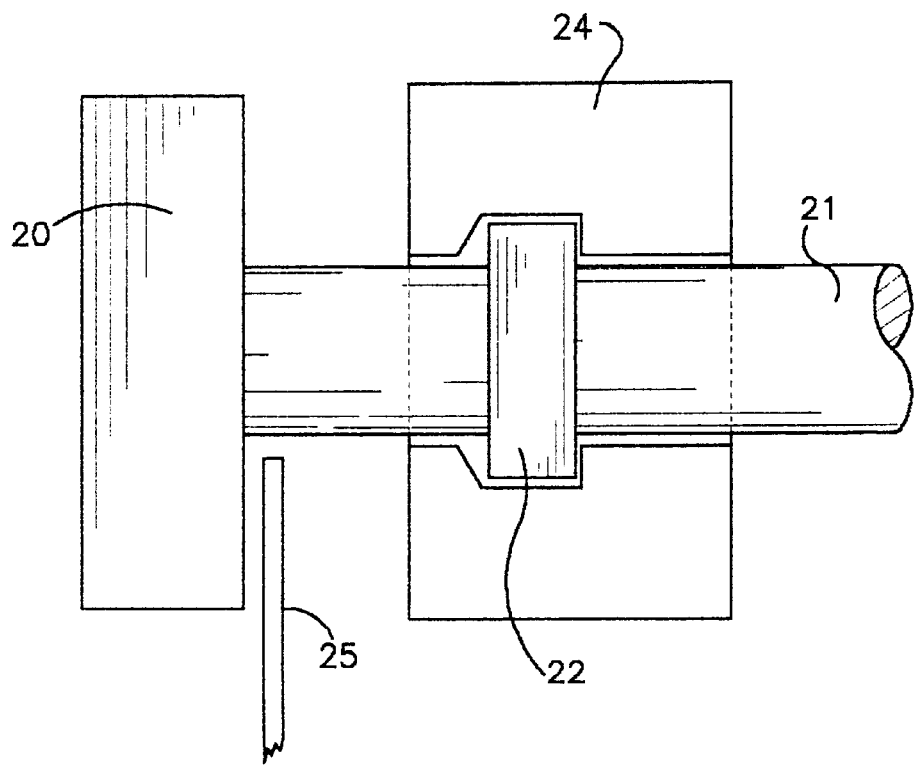
FIG. 2 is a schematic side elevational view showing an investment casting and gate gripped by a clamp, and an illustrative cut-off mechanism.

FIG. 2 illustrates an investment casting 20 made by the pattern 10, and a casting gate 21 and a locator 22 which duplicate the pattern parts 11 and 12, respectively. Reference numeral 24 designates a clamp that coacts with the locator 22 to hold the casting 20 in a desired position for the after-cast operation of severing the stub end of the gate 21 at a location near the casting 20. A cut-off 25 operates to sever the stub end of the gate 21. The cut-off 25 can be a saw blade, an electrical beam, a laser, or other suitable metal cutting means.

In practice, the locator 22 is gripped by the clamp 24 to position the casting and hold it in place. The cut-off 25 is then operated to sever the stub end of the gate 21 either flush with the casting surface or to a length within a specified tolerance of casting dimensions. Additional cutting or grinding of the gate stub may not be required. Either the casting 20 and the clamp 21 or the cut-off 25 can be easily moved to accommodate any surface profile of the casting 20. It will thus be seen that the invention achieves the objective of providing an improvement in the after-cast operation of gate removal which avoids the necessity of having a large number of casting fixtures, conforming to each particular casting shape and size.

As generally described above, the casting pattern 10 with the locator pattern 12 on its gate has additional advantages when processing the pattern through pre-casting operations. A robot with a generic clamp can coact with the locator pattern to manipulate the casting pattern 10 when it is removed from the injection mold and when it is attached to a center tree to form a set-up.

Many modifications and variations of the invention will be apparent to those skilled in the art in light of the foregoing detailed disclosure. Therefore, it is to be understood that, within the scope of the appended claims, the invention can be practiced otherwise than as specifically shown and described.

What is claimed is:

1. In the manufacture of an investment casting having a casting gate that is removed from the casting in an after-cast operation, the improvement comprising the steps of making the casting gate with a locator situated between the ends of the gate, the locator being capable of being engaged to hold the gate with the casting attached thereto, engaging the locator, and cutting through the gate near the casting while the locator is engaged.

2. In the assembly of an investment casting pattern and an attached pattern gate intended to be replicated in metal to form a metal casting with an attached casting gate, the improvement comprising a locator formation on the pattern gate between its ends which, when duplicated in metal, provides a locator on the casting gate capable of being engaged to hold the casting gate while cutting through it near the casting.

3. In an investment cast assemblage including at least one metal casting, a solidified metal supply member and a gate having one end connected to said casting and another end connected to said supply member, the improvement comprising a locator on said gate between said casting and said metal supply member, said locator having a shape that can be engaged to hold said gate with the attached casting when cutting through said gate between said locator and said casting.

4. In a pattern set-up for use in making an investment casting mold, said set-up including at least one casting pattern shaped to form a casting cavity in the mold, a member shaped to form a metal supply passage in the mold, and a pattern gate connected at one end to said casting pattern and at its other end to said member, the pattern gate being shaped to form a gating passage in the mold between the metal supply passage and the casting cavity, the improvement comprising a locator formation on the pattern gate between its ends, the locator formation having a shape which, when duplicated in metal, can be engaged while cutting through the metal gate formed in the gating passage to separate the metal gate from the casting formed in the casting cavity.

* * * * *